(12) United States Patent
Yang et al.

(10) Patent No.: US 12,520,010 B2
(45) Date of Patent: Jan. 6, 2026

(54) INTERACTION METHOD AND APPARATUS IN LIVE STREAMING ROOM, AND DEVICE AND STORAGE MEDIUM

(71) Applicant: BEIJING ZITIAO NETWORK TECHNOLOGY CO., LTD., Beijing (CN)

(72) Inventors: Ling Yang, Beijing (CN); Manting Wang, Beijing (CN); Sijing Wang, Beijing (CN); Ji Liu, Beijing (CN); Feifei Tang, Beijing (CN); Xiaoben Wang, Beijing (CN); Man Zhang, Beijing (CN); Zaiyou Ruan, Beijing (CN); Yuna Hu, Beijing (CN); Zihao Chen, Beijing (CN); Siqin Liu, Beijing (CN); Chen Zhong, Beijing (CN); Suyao Zhang, Beijing (CN); Yichao Wu, Beijing (CN); Changhua He, Beijing (CN); Zenan Li, Beijing (CN); Yibin Chen, Beijing (CN); Jialuo Zhang, Beijing (CN); Ping Li, Beijing (CN); Xinyue Gong, Beijing (CN); Jialong Zhao, Beijing (CN); Fanglu Zhong, Beijing (CN); Pingfei Fu, Beijing (CN); Yingzhao Sun, Beijing (CN); Syenny, Beijing (CN); Qi Fan, Beijing (CN); Yehua Lyu, Beijing (CN); Jiacheng Liu, Beijing (CN); Lin Zhou, Beijing (CN); Fukang Hong, Beijing (CN); Xiangzeng Meng, Beijing (CN); Qian Li, Beijing (CN); Qi Zhao, Beijing (CN); Hui Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 138 days.

(21) Appl. No.: 18/550,611

(22) PCT Filed: Mar. 14, 2022

(86) PCT No.: PCT/CN2022/080542
§ 371 (c)(1),
(2) Date: Sep. 14, 2023

(87) PCT Pub. No.: WO2022/194064
PCT Pub. Date: Sep. 22, 2022

(65) Prior Publication Data
US 2024/0171821 A1 May 23, 2024

(30) Foreign Application Priority Data
Mar. 15, 2021 (CN) .......................... 202110278073.7

(51) Int. Cl.
*H04N 21/472* (2011.01)
*H04N 21/2187* (2011.01)
*H04N 23/60* (2023.01)

(52) U.S. Cl.
CPC ....... *H04N 21/472* (2013.01); *H04N 21/2187* (2013.01); *H04N 23/64* (2023.01)

(58) Field of Classification Search
CPC ............. H04N 21/472; H04N 21/2187; H04N 21/4223; H04N 21/4788; H04N 21/2393;
(Continued)

(56) References Cited

U.S. PATENT DOCUMENTS

| 2015/0244987 A1* | 8/2015 | Delegue | ................ H04M 3/567 348/14.09 |
| 2019/0342620 A1* | 11/2019 | Yan | ..................... H04N 21/4312 |
| 2024/0414286 A1* | 12/2024 | Yoshizawa | ........... H04N 23/661 |

FOREIGN PATENT DOCUMENTS

| CN | 105608715 A | 5/2016 |
| CN | 107295184 A | * 10/2017 |

(Continued)

OTHER PUBLICATIONS

English translation version of CN 108989691 A (Year: 2018).*
(Continued)

*Primary Examiner* — Gigi L Dubasky
(74) *Attorney, Agent, or Firm* — Fish & Richardson P.C.

(57) ABSTRACT

Provided are an interaction method and apparatus in a live streaming room, and a device and a storage medium. The method comprises: in response to a trigger operation for a preset duet entry on a live streaming room page, jumping from the live streaming room page to a camera capture page,
(Continued)

wherein a host portrait cutout corresponding to the live streaming room page is displayed on the camera capture page and a capture control is provided on the camera capture page acquiring multimedia information captured by a camera, in response to a trigger operation for the capture control on the camera capture page, wherein the multimedia information comprises an image or a video; and synthesizing the multimedia information with the host portrait cutout to obtain a duet multimedia product.

20 Claims, 11 Drawing Sheets

(58) Field of Classification Search
CPC ........... H04N 21/42653; H04N 21/431; H04N 21/437; H04N 23/60; H04N 23/631; H04N 23/632
See application file for complete search history.

(56) References Cited

FOREIGN PATENT DOCUMENTS

| | | | | |
|---|---|---|---|---|
| CN | 108933891 | A | 12/2018 | |
| CN | 108989691 | A * | 12/2018 | ......... H04N 5/23216 |
| CN | 109040643 | A | 12/2018 | |
| CN | 110166799 | A * | 8/2019 | |
| CN | 111866434 | A | 10/2020 | |
| CN | 113068053 | A | 7/2021 | |
| WO | WO2013163904 | A1 | 11/2013 | |

OTHER PUBLICATIONS

English translation version of CN 110166799 A (Year: 2019).*
English translation version of CN 107295184 A (Year: 2017).*
International Search Report (with English translation) and Written Opinion issued in PCT/CN2022/080542, dated Jun. 1, 2022, 9 pages provided.

* cited by examiner

TION METHOD AND APPARATUS
IN LIVE STREAMING ROOM, AND DEVICE
AND STORAGE MEDIUM

This application is the national phase of International Patent Application No. PCT/CN2022/080542 filed on Mar. 14, 2022, which claims priority to Chinese Patent Application No. 202110278073.7, titled "INTERACTION METHOD AND APPARATUS IN LIVE STREAMING ROOM, AND DEVICE AND STORAGE MEDIUM", filed on Mar. 15, 2021 with the China National Intellectual Property Administration, both of which are incorporated herein by reference in their entireties.

FIELD

The present disclosure relates to the field of data processing, and in particular to an interaction method and an interaction apparatus in a live streaming room, a device and a storage medium.

BACKGROUND

With the development of network technology, watching live streaming has gradually become one of the ways for people to entertain themselves. At present, interaction functions in the live streaming room are relatively simple. How to enrich the interaction functions in the live streaming room so as to attract users to stay in the live streaming room is a technical problem that is continuously explored in the current live streaming field.

SUMMARY

In order to solve the above technical problems or at least partly solve the above technical problems, an interaction method and an interaction apparatus in a live streaming room, a device and a storage medium are provided in the present disclosure. A duet function is provided in the live streaming room, thereby enriching the interaction modes in the live streaming room and improving the user experience in the live streaming room.

In a first aspect, an interaction method in a live streaming room is provided according to the disclosure. The method includes: jumping, in response to a trigger operation for a preset duet entry on a live streaming room page, from the live streaming room page to a camera capture page, where a host portrait cutout corresponding to the live streaming room page is displayed on the camera capture page and a capture control is provided on the camera capture page; acquiring multimedia information captured by a camera in response to a trigger operation for the capture control on the camera capture page, where the multimedia information includes an image or a video; and synthesizing the multimedia information with the host portrait cutout to obtain a duet multimedia product.

In an optional embodiment, the jumping, in response to a trigger operation for a preset duet entry on a live streaming room page, from the live streaming room page to a camera capture page includes: jumping, in response to the trigger operation for the preset duet entry on the live streaming room page, from the live streaming room page to an activity participation page corresponding to the preset duet entry, where activity introduction information is displayed on the activity participation page, and a duet participation control is provided on the activity participation page; and jumping, in response to a trigger operation for the duet participation control on the activity participation page, from the activity participation page to the camera capture page.

After synthesizing the multimedia information captured by the camera with the host portrait cutout to obtain the duet multimedia product, the method further includes: displaying prompt information indicating successful participation in an activity on the live streaming room page in response to a successful publishing operation for the duet multimedia product.

In an optional embodiment, before acquiring the multimedia information captured by the camera in response to the trigger operation for the capture control on the camera capture page, the method further includes: switching a style of the host portrait cutout on the camera capture page.

In an optional embodiment, the multimedia information captured by the camera includes a portrait, and the synthesizing the multimedia information captured by the camera with the host portrait cutout to obtain a duet multimedia product includes: determining, based on a preset layer order, a hierarchical relationship between the portrait in the multimedia information captured by the camera and the host portrait cutout; and synthesizing, based on the hierarchical relationship, the multimedia information captured by the camera with the host portrait cutout to obtain the duet multimedia product.

In an optional embodiment, the synthesizing, based on the hierarchical relationship, the multimedia information captured by the camera with the host portrait cutout to obtain the duet multimedia product includes: performing portrait cutout processing on the multimedia information captured by the camera to obtain a portrait cutout corresponding to the portrait in a case that the hierarchical relationship indicates that the portrait is in a layer over the host portrait cutout; and arranging the portrait cutout in the layer over the host portrait cutout, and synthesizing the portrait cutout and the host portrait cutout with the multimedia information captured by the camera to obtain the duet multimedia product.

In an optional embodiment, the synthesizing, based on the hierarchical relationship, the multimedia information captured by the camera with the host portrait cutout to obtain the duet multimedia product includes: synthesizing, based on the hierarchical relationship, the multimedia information captured by the camera with the host portrait cutout to obtain the duet multimedia product, in a case that the hierarchical relationship indicates that the portrait is in a layer under the host portrait cutout.

In an optional embodiment, before synthesizing the multimedia information captured by the camera with the host portrait cutout to obtain the duet multimedia product, the method further includes: adjusting a display position and/or a display size of the host portrait cutout on the camera capture page.

In an optional embodiment, a capture posture line is displayed on the camera capture page, and the capture posture line is used to guide a capture posture of a user.

In an optional embodiment, the preset duet entry is configured with a countdown, the method further includes: upon detecting that the countdown corresponding to the preset duet entry is over, displaying prompt information indicating failure of participating in the activity on the live streaming room page if it is determined that there is no successful publishing operation for the duet multimedia product.

In an optional embodiment, after displaying the prompt information indicating successful participation in the activity on the live streaming room page in response to the successful publishing operation for the duet multimedia product, the method further includes: displaying, in response to a message of winning an activity object of the activity corresponding to the activity participation page, a mailing information filling page, where a mailing information submission control is provided on the mailing information filling page; and acquiring, in response to a trigger operation for the mailing information submission control, mailing information filled on the mailing information filling page, where the mailing information is used for mailing the activity object.

In a second aspect, an interaction apparatus in a live streaming room is provided according to the disclosure. The apparatus includes: a first jumping module configured to jump, in response to a trigger operation for a preset duet entry on a live streaming room page, from the live streaming room page to a camera capture page, where a host portrait cutout corresponding to the live streaming room page is displayed on the camera capture page and a capture control is provided on the camera capture page; a first acquiring module configured to acquire multimedia information captured by a camera in response to a trigger operation for the capture control on the camera capture page, where the multimedia information includes an image or a video; and a first synthesizing module configured to synthesize the multimedia information with the host portrait cutout to obtain a duet multimedia product.

In a third aspect, a computer-readable storage medium is provided according to the disclosure. The computer-readable storage medium stores instructions. The instructions, when being executed in a terminal device, cause the terminal device to perform the method described above.

In a fourth aspect, a device is provided according to the disclosure. The device includes a memory, a processor, and computer programs which are stored in the memory and operable on the processor. The processor, when executing the computer programs, performs the method described above.

In a fifth aspect, a computer program product is provided according to the disclosure. The computer program product includes computer programs/instructions. The computer programs/instructions, when being executed by a processor, cause the processor to perform the method described above.

Compared with the conventional art, the technical solutions provided by the embodiments of the present disclosure have the following advantages. An interaction method in a live streaming room is provided according to an embodiment of the present disclosure. In response to a trigger operation for a preset duet entry on a live streaming room page, a jump from the live streaming room page to a camera capture page is implemented, where a host portrait cutout corresponding to the live streaming room page is displayed on the camera capture page and a capture control is provided on the camera capture page. Multimedia information captured by a camera is acquired in response to a trigger operation for the capture control on the camera capture page, where the multimedia information includes an image or a video. The multimedia information captured by the camera is synthesized with the host portrait cutout to obtain a duet multimedia product. In the embodiments of the present disclosure, the duet function is provided in the live streaming room, a duet effect between the user and the host in the live streaming room is achieved, thereby enriching the interaction modes in the live streaming room and improving the user experience in the live streaming room.

BRIEF DESCRIPTION OF THE DRAWINGS

The accompanying drawings, which are incorporated in the specification and constitute a part of the specification, illustrate embodiments of the present disclosure and together with the description serve to explain the principles of the present disclosure.

In order to more clearly explain the embodiments of the present disclosure or the technical solutions in the conventional art, the drawings used in the description of the embodiments or the conventional art are briefly introduced below. Apparently, for those skilled in the art, other drawings may be obtained according to the provided drawings without any creative effort.

DETAILED DESCRIPTION OF EMBODIMENTS

In order to more clearly understand the above objects, features and advantages of the present disclosure, the solutions of the present disclosure will be further described below. It should be noted that, in the case of no conflict, the embodiments of the present disclosure and the features in the embodiments may be combined with each other.

In the following description, many specific details are set forth in order to fully understand the present disclosure, however the present disclosure may also be implemented in other ways than those described herein. Apparently, the embodiments in the specification are only some of, rather than all, embodiments of the present disclosure.

With the development of the live streaming technology, users have more and more requirements for interaction functions in the live streaming room. How to enrich the interaction functions in the live streaming room to meet the requirements of users is a technical problem that is continuously explored in the current live streaming field.

An interaction method in a live streaming room is provided according to an embodiment of the present disclosure. A duet effect between the user and the host in the live streaming room is achieved by providing the duet function in the live streaming room. Specifically, in response to a trigger operation for a preset duet entry on a live streaming room page, a jump from the live streaming room page to a camera capture page is implemented, where a host portrait cutout corresponding to the live streaming room page is displayed on the camera capture page and a capture control is provided on the camera capture page. Multimedia information captured by a camera is acquired in response to a trigger operation for the capture control on the camera capture page, where the multimedia information includes an image or a video. The multimedia information captured by the camera is synthesized with the host portrait cutout to obtain a duet multimedia product. In the embodiments of the present disclosure, the interaction functions in the live streaming room are enriched and the user experience in the live streaming room is improved.

Figure 1:
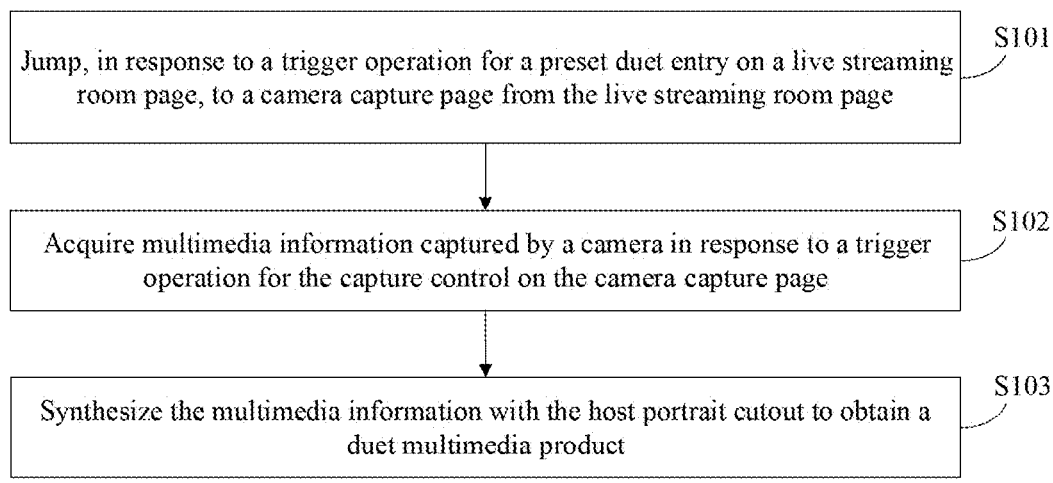
FIG. 1 is a flow chart of an interaction method in a live streaming room according to an embodiment of the present disclosure.

Based on this, an interaction method in a live streaming room is provided according to an embodiment of the present disclosure. Referring to FIG. 1, FIG. 1 is a flow chart of an interaction method in a live streaming room according to an embodiment of the present disclosure. The method includes S101 to S103.

S101, jump, in response to a trigger operation for a preset duet entry on a live streaming room page, from the live streaming room page to a camera capture page.

A host portrait cutout corresponding to the live streaming room page is displayed on the camera capture page and a capture control is provided on the camera capture page.

Figure 2:
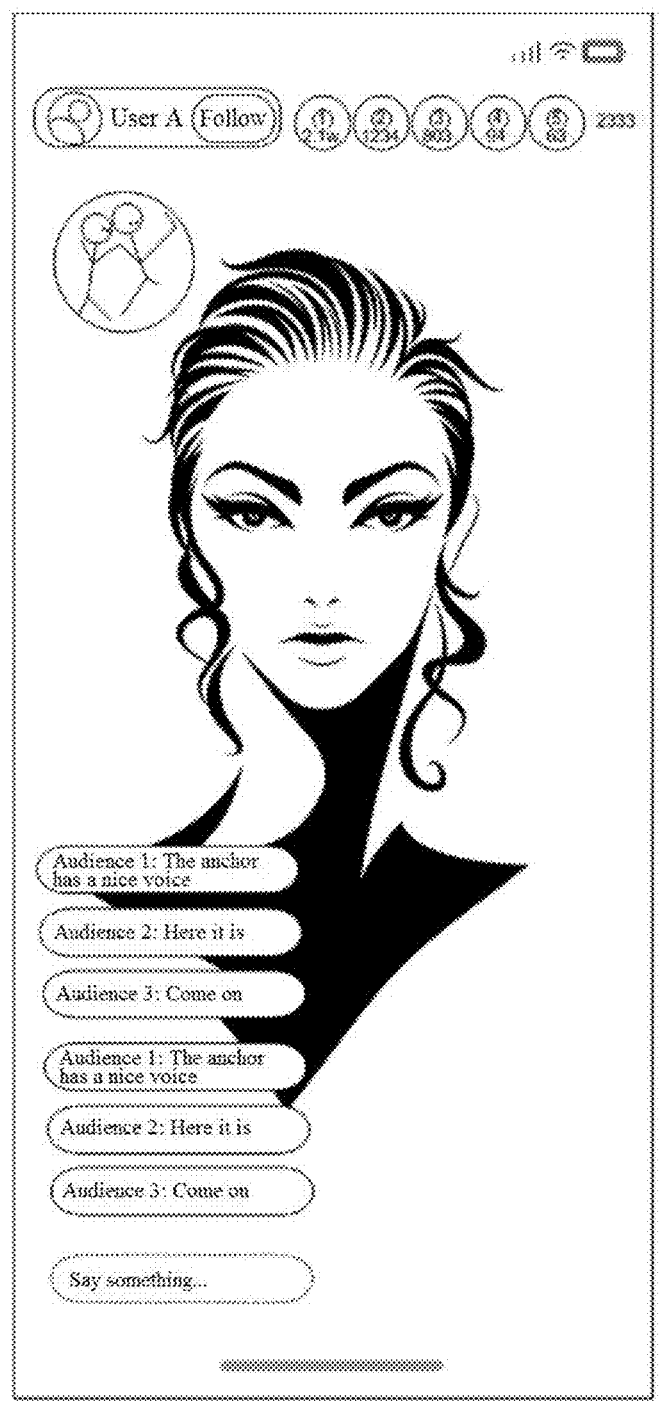
FIG. 2 is a schematic diagram of a live streaming room page according to an embodiment of the present disclosure.

In the embodiment of the present disclosure, after a user enters a live streaming room, during the process of watching the live streaming, the preset duet entry may be displayed on the live streaming room page. The preset duet entry may be in the form of an animation or in the form of an image. As shown in FIG. 2, FIG. 2 is a schematic diagram of a live streaming room page according to an embodiment of the present disclosure. The preset duet entry is displayed on the upper left corner of the live streaming room page, and the user may trigger a duet function by clicking the preset duet entry. The duet function may include a duet photo function and a duet video function.

Figure 3:
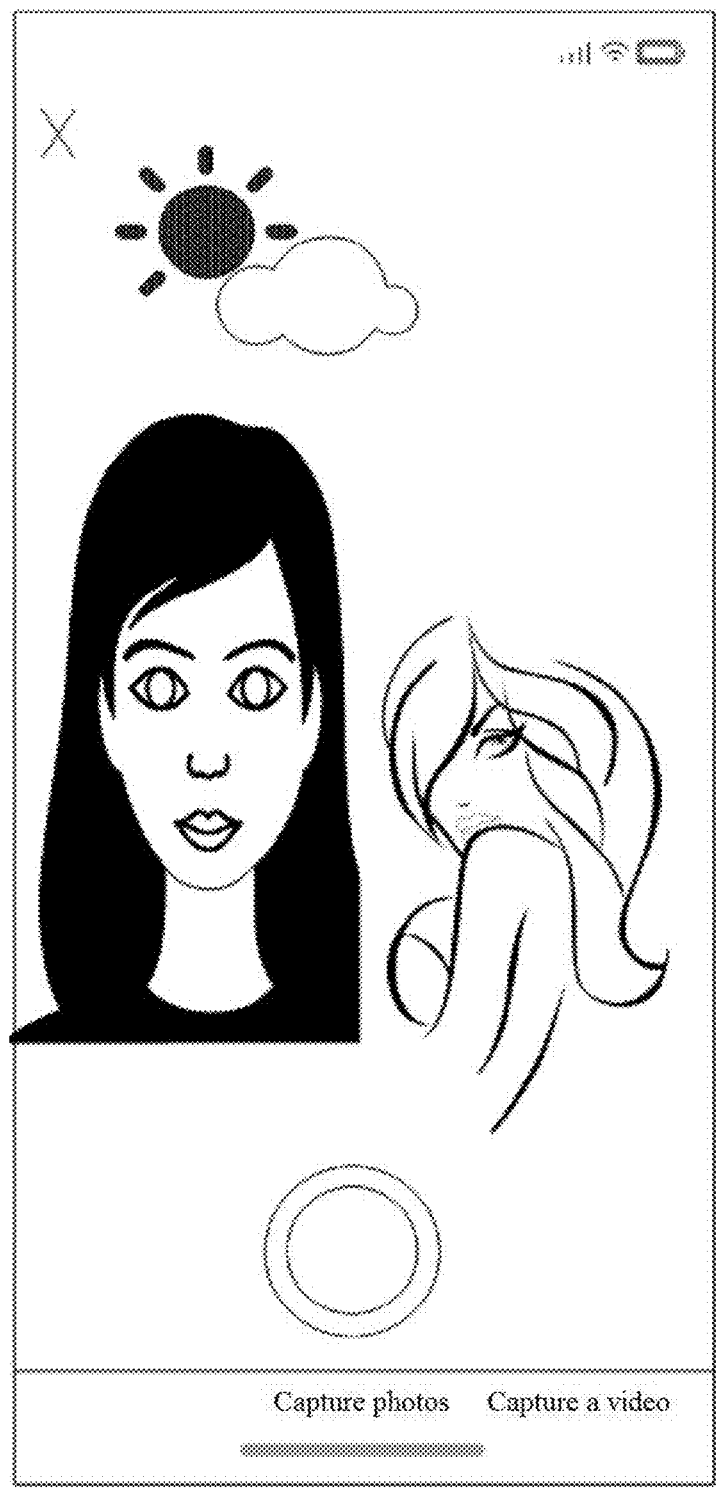
FIG. 3 is a schematic diagram of a camera capture page according to an embodiment of the present disclosure.

In the embodiment of the present disclosure, when the trigger operation for the preset duet entry on the live streaming room page performed by the user is received, a jump from the live streaming room page to the camera capture page is implemented. As shown in FIG. 3, FIG. 3 is a schematic diagram of a camera capture page according to an embodiment of the present disclosure. The host portrait cutout corresponding to the live streaming room page is displayed on the camera capture page. Specifically, the host portrait cutout may be pre-configured for the duet function. Alternatively, the host portrait cutout may be obtained when receiving the trigger operation for the preset duet entry on the live streaming room page performed by the user, by taking a screenshot of the live streaming room page and performing portrait cutout processing on the screenshot.

In addition, the camera capture page displays the capture control, such as a capture button, as shown in FIG. 3, the capture control is used to trigger a capture function of the camera.

S102, acquire multimedia information captured by a camera in response to a trigger operation for the capture control on the camera capture page, where the multimedia information includes an image or a video.

In the embodiment of the present disclosure, the user may trigger the capture function of the camera by clicking the capture control on the camera capture page. The multimedia information captured by the camera is acquired when receiving the trigger operation for the capture control on the camera capture page. The multimedia information includes an image or a video.

In practice, the host portrait cutout is displayed on the camera capture page, as shown in FIG. 3, and the user may adjust a capture posture based on information such as a position and a size of the host portrait cutout. When the adjusted capture posture meets requirements, the capture control on the camera capture page is clicked to acquire the image or video captured by the camera.

Figure 4:
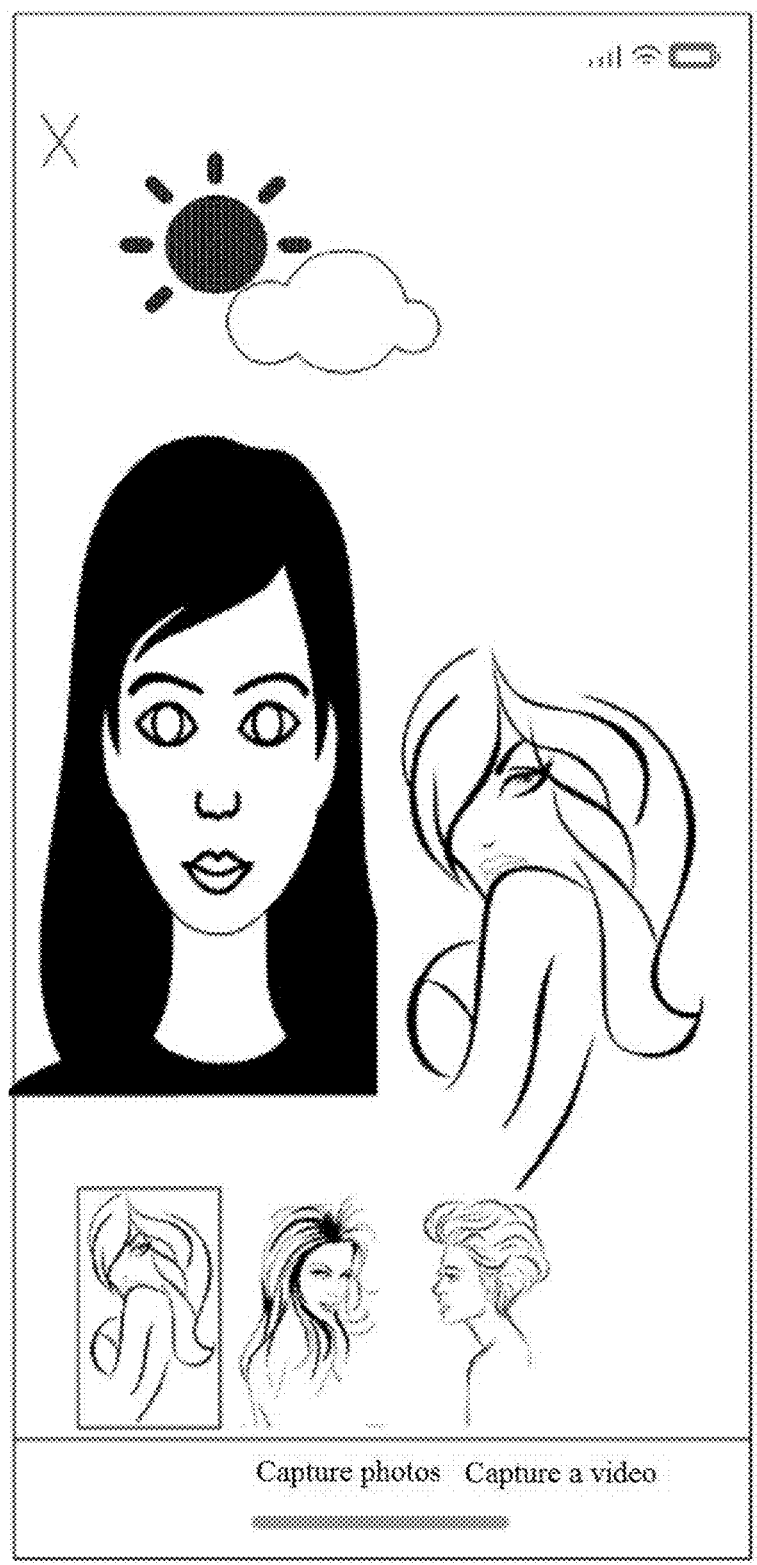
FIG. 4 is a schematic diagram of a camera capture page according to another embodiment of the present disclosure.

In an optional embodiment, at least one available style of the host portrait cutout may also be displayed on the camera capture page, as shown in FIG. 4, and the user may switching a style of the host portrait cutout currently displayed on the camera capture page to meet personalized aesthetic needs of the user.

In another optional embodiment, the user may adjust a display position, a display size or the like of the host portrait cutout currently displayed on the camera capture page, to meet personalized capture needs of the user. Specifically, the display position of the host portrait cutout may be adjusted by selecting and dragging the host portrait cutout. The display size of the host portrait cutout may be adjusted by selecting and zooming in or out the host portrait cutout.

In addition, a capture posture line may be displayed on the camera capture page, and the capture posture line is used to guide a capture posture of the user. Specifically, a corresponding capture posture line may be set for each host portrait cutout, and the capture posture line may be switched while switching the style of the host portrait cutout. In the embodiment of the present disclosure, the user can obtain an image or video with a better effect by performing the capture based on the capture posture line.

S103: synthesize the multimedia information with the host portrait cutout to obtain a duet multimedia product.

In the embodiment of the present disclosure, after the multimedia information captured by the camera is acquired, the multimedia information captured by the camera is synthesized with the host portrait cutout to finally obtain the duet multimedia product. The duet multimedia product may include a host portrait and a user portrait, to achieve a duet effect between the user and the host. Specifically, the duet multimedia product includes a duet image product or a duet video product. The duet image product is obtained by synthesizing the image captured by the camera with the host portrait cutout. The duet video product is obtained by synthesizing each video frame in the video captured by the camera with the host portrait cutout.

In addition, how to synthesize the multimedia information captured by the camera and the host portrait cutout to obtain the duet multimedia product will be described in subsequent embodiments.

An interaction method in a live streaming room is provided according to an embodiment of the present disclosure. In response to a trigger operation for a preset duet entry on a live streaming room page, a jump from the live streaming room page to a camera capture page is implemented, where a host portrait cutout corresponding to the live streaming room page is displayed on the camera capture page and a capture control is provided on the camera capture page. Multimedia information captured by a camera is acquired in response to a trigger operation for the capture control on the camera capture page, where the multimedia information includes an image or a video. The multimedia information is synthesized with the host portrait cutout to obtain a duet multimedia product. In the embodiments of the present disclosure, the duet function is provided in the live streaming room, a duet effect between the user and the host in the live streaming room is achieved, thereby enriching the interaction modes in the live streaming room and improving the user experience in the live streaming room.

Figure 5:
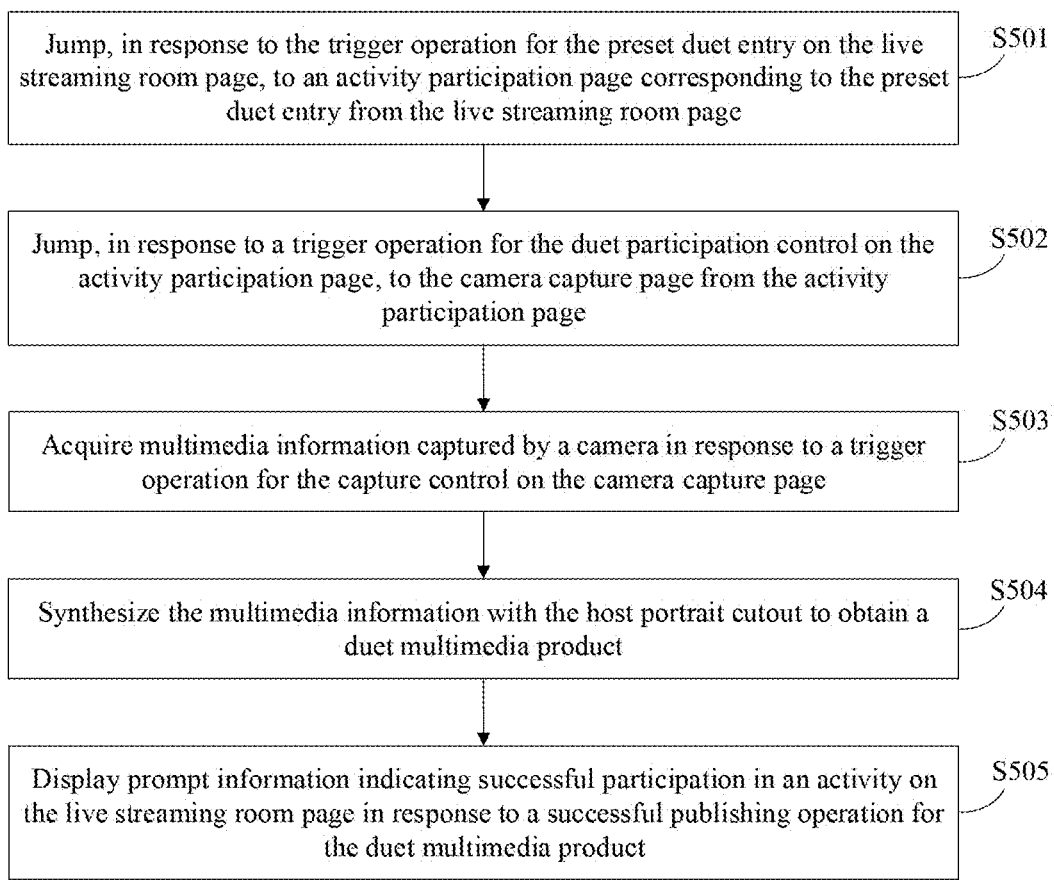
FIG. 5 is a flow chart of an interaction method in a live streaming room according to another embodiment of the present disclosure.

On the basis of the above embodiment, the present disclosure further provides a scene example of an interaction method in a live streaming room, as shown in FIG. 5. FIG. 5 is a flow chart of an interaction method in a live streaming room according to another embodiment of the present disclosure. The method includes S501 to S505.

S501, jump, in response to the trigger operation for the preset duet entry on the live streaming room page, from the live streaming room page to an activity participation page corresponding to the preset duet entry.

Activity introduction information is displayed on the activity participation page, and a duet participation control is provided on the activity participation page. The duet participation control is used to trigger the duet function.

In the embodiment of the present disclosure, the preset duet entry is displayed on the live streaming room page. As shown in FIG. 2, the preset duet entry may be an entry configured for a preset activity. For example, the preset activity may be lucky draw, receiving red envelopes, receiving virtual items such as coupons.

In an optional embodiment, before displaying the preset duet entry on the live streaming room page, an effect animation may be played to remind the user that the activity is about to start. Specifically, the effect animation may be a countdown 3, 2, 1 animation, or other types of effect animation, which is not limited here. After the effect animation is played, the preset duet entry is displayed on the live streaming room page, and the user may click the preset duet entry to enter the activity participation page.

In addition, in the embodiment of the present disclosure, the preset activity may be configured with an activity participation condition. For example, the activity participation condition may be that the current user has joined the fan club of the host of the live streaming room, and the like. When the trigger operation for the preset duet entry on the live streaming room page is received, it is firstly determined whether the current user meets the activity participation condition. The activity participation page is entered if the current user meets the activity participation condition. Prompt information indicating that the current user does not meet the activity participation condition is displayed if the current user does not meet the activity participation condition. The activity participation condition may be configured based on activity requirements, which is not limited here.

In practice, when the trigger operation for the preset drawing entry on the live streaming room page is received, a jump from the live streaming room page to the activity participation page corresponding to the preset duet entry is implemented. Activity introduction information is displayed on the activity participation page, the duet participation control is provided on the activity participation page for triggering the duet function.

Figure 6:
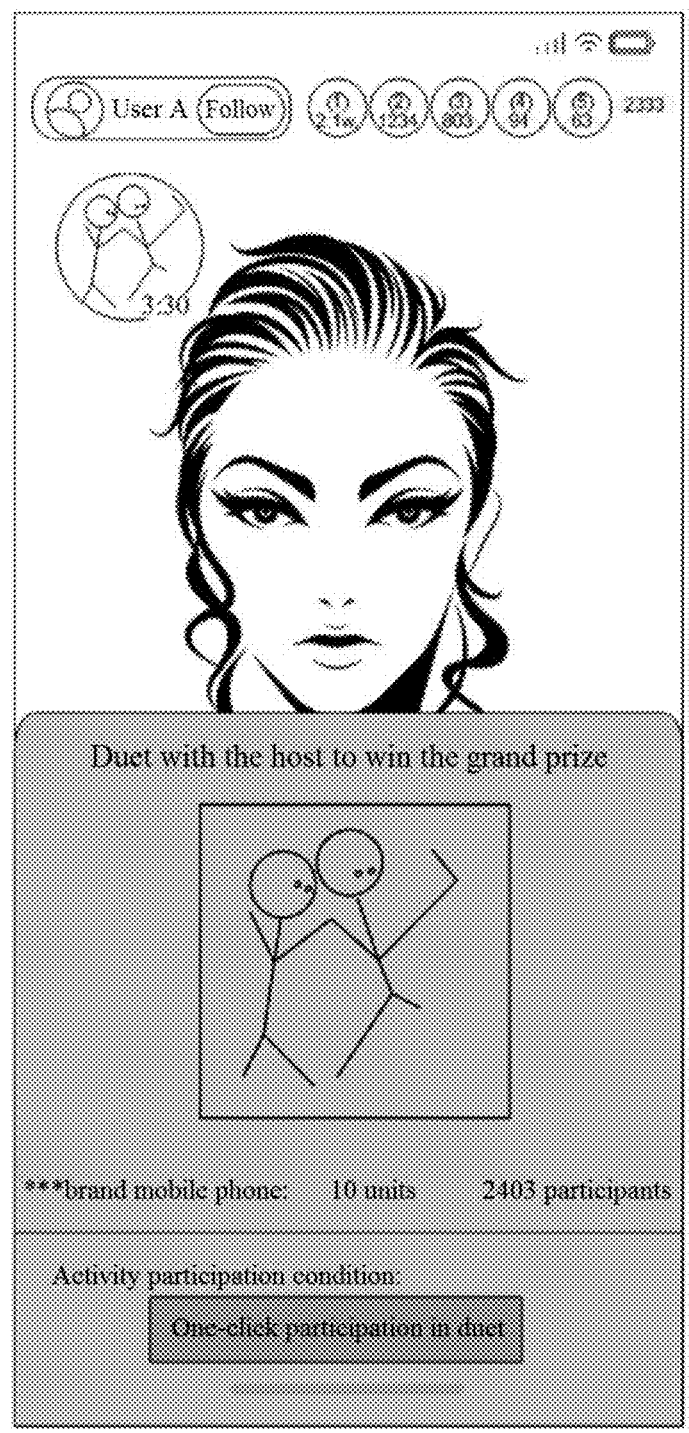
FIG. 6 is a schematic diagram of an activity participation page according to an embodiment of the present disclosure.

As shown in FIG. 6, FIG. 6 is a schematic diagram of an activity participation page according to an embodiment of the present disclosure. Activity introduction information displayed on the activity participation page may include activity reward items, quantity, and activity participation conditions or the like. In addition, the activity participation page may be a half-screen page displayed above the live streaming room page, and the half-screen page may be dragged up and down to view content not displayed.

In addition, the duet participation control is provided on the activity participation page, as shown in FIG. 6. The capture function of the camera is invoked by clicking the duet participation control, to achieve the duet effect between the user and the host.

S502, jump, in response to a trigger operation for the duet participation control on the activity participation page, from the activity participation page to the camera capture page.

In the embodiment of the present disclosure, when the trigger operation for the duet participation control on the activity participation page is received, the capture function of the camera is invoked, and a jump from the activity participation page to the camera capture page is implemented.

In an optional embodiment, a payment condition may also be configured in advance for the activity introduced in the activity participation page, for example, 1 virtual currency needs to be paid to participate in this lucky draw activity. In this case, when the trigger operation for the duet participation control on the activity participation page is received, a virtual currency payment function may be called first, and a window for the user to determine whether to pay the virtual currency pops up. If the user performs the payment and the payment is successful, a jump to the camera capture page is implemented. If there is not a successful payment, a window for indicating that the user fails to participate in the activity pops up.

In the embodiment of the present disclosure, the host portrait cutout corresponding to the live streaming room page is displayed on the camera capture page and the capture control is provided on the camera capture page, as shown in FIG. 3. Specifically, the description for the camera capture page may be understood with reference to the above-mentioned embodiments, and details are not repeated here.

S503, acquire multimedia information captured by a camera, in response to a trigger operation for the capture control on the camera capture page, where the multimedia information includes an image or a video.

S503 in the embodiment of the present disclosure is implemented in the same manner as S102 in the foregoing embodiment, and may be understood by referring to the description of S102 in the foregoing embodiment, and details are not repeated here.

S504: synthesize the multimedia information with the host portrait cutout to obtain a duet multimedia product.

In the embodiment of the present disclosure, after the multimedia information captured by the camera is acquired, the multimedia information captured by the camera may be synthesized with the host portrait cutout based on a preset layer order, to finally obtain the duet multimedia product. The preset layer order is used to indicate a hierarchical relationship between the host portrait cutout and the portrait in the multimedia information captured by the camera. For example, the hierarchical relationship may indicate that the portrait is in a layer over the host portrait cutout or the hierarchical relationship may indicate that the portrait is in a layer under the host portrait cutout.

In an optional embodiment, firstly, a hierarchical relationship between the portrait in the multimedia information captured by the camera and the host portrait cutout is determined based on a preset layer order. The preset layer order may be a default layer order of the system, or may be a layer order set by the user in real time based on capture requirements. Then the multimedia information captured by the camera is synthesized with the host portrait cutout based on the hierarchical relationship, to obtain the duet multimedia product. Synthesizing the video captured by the camera with the host portrait cutout may be implemented as synthesizing each frame of the video captured by the camera with the host portrait cutout.

In an optional embodiment, in a case that the hierarchical relationship indicates that the portrait in the multimedia information captured by the camera is in a layer over the host portrait cutout, portrait cutout processing is firstly performed on the multimedia information captured by the camera to obtain a portrait cutout corresponding to the portrait, then the portrait cutout is arranged in the layer over the host portrait cutout and the portrait cutout and the host portrait cutout are synthesized with the multimedia information captured by the camera to obtain the duet multimedia product. Specifically, the portrait cutout and the host portrait cutout may be synthesized with the multimedia information captured by the camera in the order of from a top layer to a bottom layer.

In another optional embodiment, in a case that the hierarchical relationship indicates that the portrait in the multimedia information captured by the camera is in a layer under the host portrait cutout, the multimedia information captured by the camera may be synthesized with the host portrait cutout based on the hierarchical relationship, to obtain the duet multimedia product. Since the host portrait cutout is in a layer over the portrait in the multimedia information captured by the camera, there is no need to perform portrait cutout processing on the multimedia information captured by the camera, and the host portrait cutout may be directly synthesized with the multimedia information captured by the camera.

The implementation manner of S504 in the embodiment of the present disclosure is the same as the implementation manner of S103 in the foregoing embodiment, therefore, the steps may be understood with reference to the descriptions of the two steps.

S505, display prompt information indicating successful participation in an activity on the live streaming room page in response to a successful publishing operation for the duet multimedia product.

Figure 7:
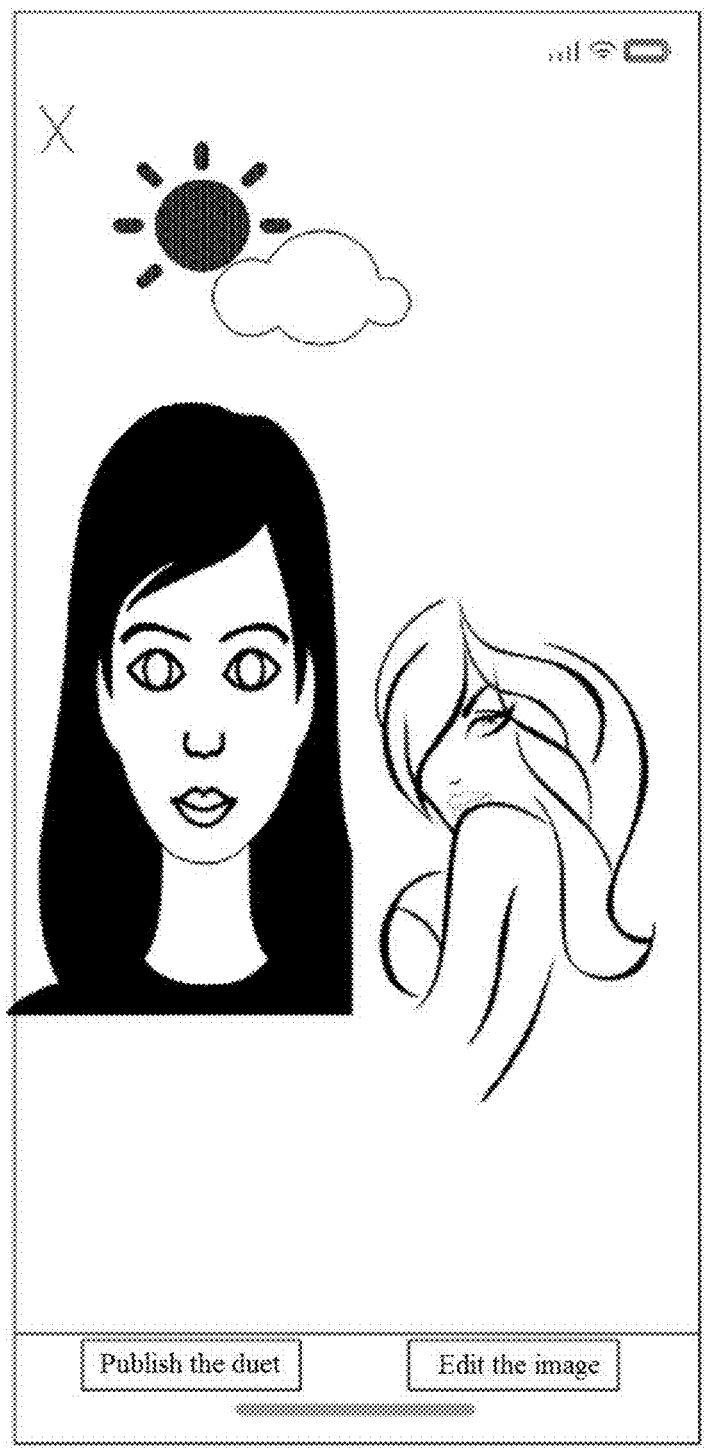
FIG. 7 is a schematic diagram of a duet image preview page according to an embodiment of the present disclosure.

In the embodiment of the present disclosure, after the duet multimedia product is obtained, the duet multimedia product may be published, so that other users and the host can view the duet multimedia product, thereby enriching the interaction modes in the live streaming room. As shown in FIG. 7, FIG. 7 is a schematic diagram of a duet image product preview page according to an embodiment of the present disclosure. A duet publishing button is provided on the duet image product preview page. An operation of publishing the duet multimedia product may be triggered by clicking the duet publishing button. In addition, an image editing button is provided on the duet image product preview page. The duet multimedia product displayed on the duet image product preview page may be further edited by clicking the image editing button.

In the embodiment of the present disclosure, when receiving the successful publishing operation for the duet multimedia product, prompt information indicating successful participation in an activity is displayed on the live streaming room page, so as to remind the user to that the user has successfully participated in the activity. For example, the qualification to participate in the activity can be successfully obtained through the successful publishing of the duet multimedia product.

In addition, in the embodiment of the present disclosure, the preset duet entry on the live streaming room page may be configured with a countdown. During the countdown, the qualification to participate in the activity can be successfully obtained by successfully publishing the duet multimedia product through the duet function. After the countdown is over, the corresponding activity will end. That is to say, after the countdown is over, the qualification to participate in the activity cannot be obtained by successfully publishing the duet multimedia product.

Specifically, upon detecting that the countdown corresponding to the preset duet entry is over, prompt information indicating failure of participating in the activity is displayed on the live streaming room page if it is determined that there is no successful publishing operation for the duet multimedia product.

In practice, the countdown corresponding to the preset duet entry may be detected with a preset time period, and if it is determined that the countdown is over and there is no successful publishing operation for the duet multimedia product, the prompt information indicating failure of participating in the activity is displayed on the live streaming room page.

In another optional embodiment, it is also possible to detect whether the countdown corresponding to the preset duet entry is over when receiving the successful publishing operation for the duet multimedia product. If the countdown is not over, prompt information indicating successful participation in the activity is displayed on the live streaming room page. If the countdown is over, prompt information indicating failure of participating in the activity is displayed on the live streaming room page.

On the basis of the above-mentioned embodiments, if it is determined that the current user has successfully participated in the activity by successfully publishing the duet multimedia product, when receiving a message of winning an activity object of the activity corresponding to the activity participation page, mailing information of the activity object may be collected online, so as to realize the online closed loop of the activity.

In an optional embodiment, a mailing information filling page is displayed in response to a message of winning an activity object of the activity corresponding to the activity participation page. A mailing information submission control is provided on the mailing information filling page. Mailing information filled on the mailing information filling page is acquired in response to a trigger operation for the mailing information submission control. The mailing information is used for mailing the activity object.

Figure 8:
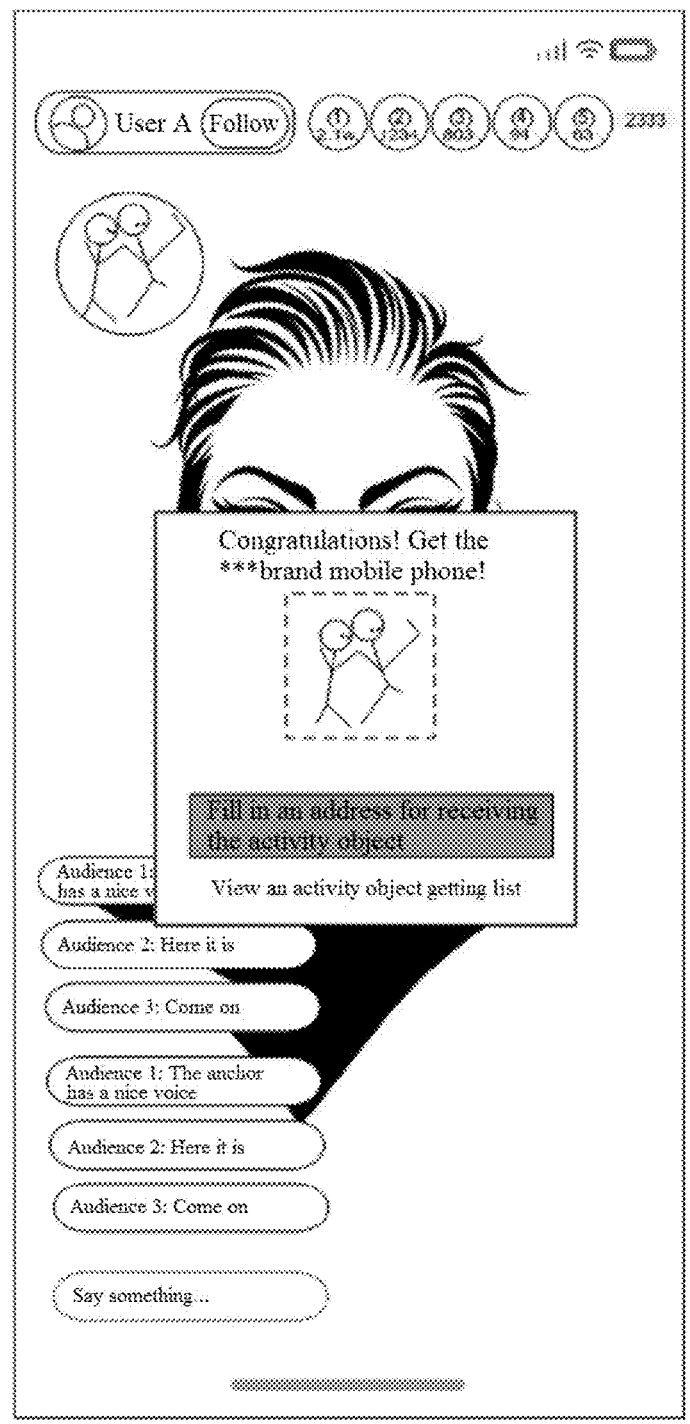
FIG. 8 is a schematic diagram of an activity object winning prompt window according to an embodiment of the present disclosure.

In practice, an activity object winning prompt window may be displayed on the live streaming room page when receiving the message of winning the activity object of the activity corresponding to the activity participation page. The activity object winning prompt window is provided with an activity object receiving entry. The activity object is a real object. As shown in FIG. 8, FIG. 8 is a schematic diagram of an activity object receiving prompt window according to an embodiment of the present disclosure.

When the user clicks the activity object receiving entry on the activity object receiving prompt window, the mailing information filling page may be displayed, so that the user can fill in the mailing information of the activity object and realize the online closed loop of the activity.

Figure 9:
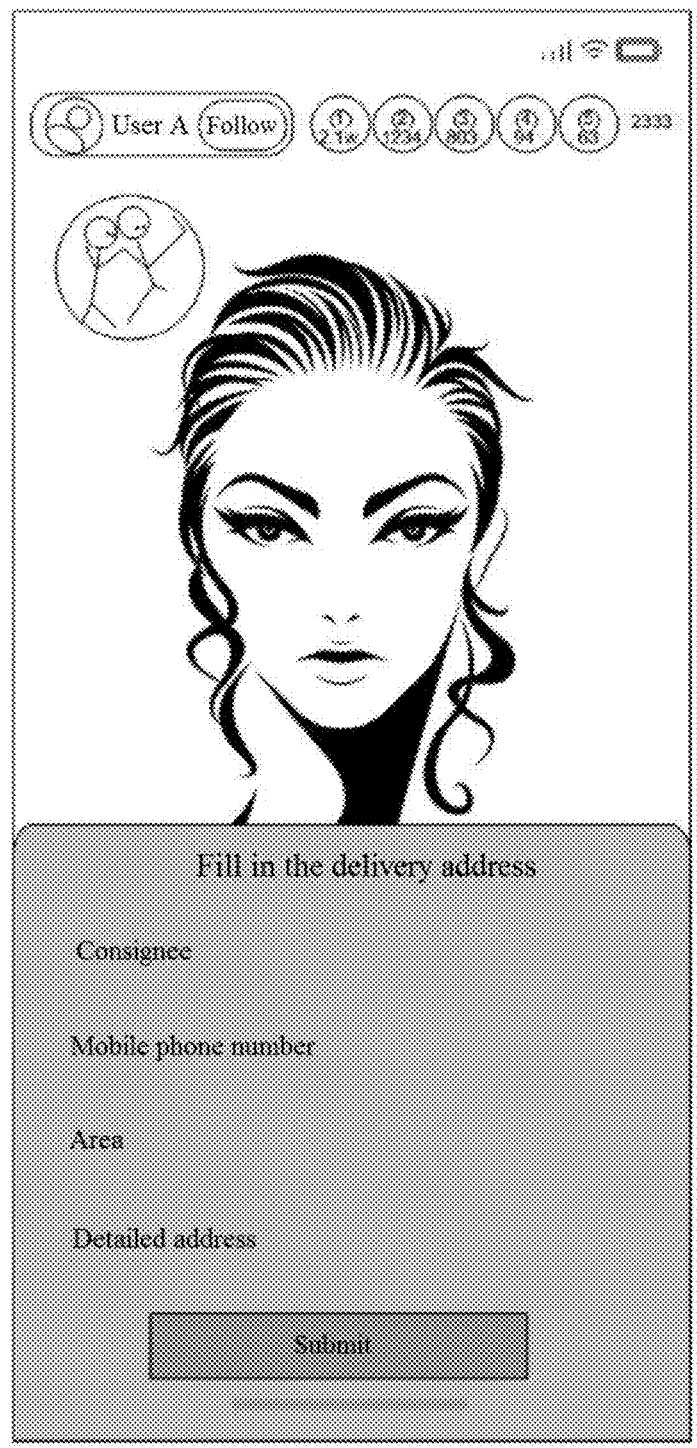
FIG. 9 is a schematic diagram of a mailing information filling page according to an embodiment of the present disclosure.

Specifically, the mailing information filling page is displayed in response to a trigger operation for the activity object receiving entry on the activity object winning prompt window. The mailing information submission control is provided on the mailing information filling page. As shown in FIG. 9, FIG. 9 is a schematic diagram of a mailing information filling page according to an embodiment of the present disclosure.

In addition, when the user completes filling of the mailing information and clicks the mailing information submission control, uploading of the mailing information is triggered, and the staff in the live streaming room may mail the activity object offline based on the mailing information.

Specifically, in response to a trigger operation for the mailing information submission control, the mailing information filled on the mailing information filling page is uploaded.

In an optional embodiment, if a message of the current user not winning an activity object of the activity is received, prompt information for indicating not winning the activity object may be displayed for the user, and a display manner of the prompt information is not limited here.

In an optional embodiment, the activity object winning prompt window is provided with a viewing entry for viewing a list of users winning the activity object, so that the user can view the list of users winning the activity object. As shown in FIG. 8, the activity object winning prompt window is provided with the viewing entry for viewing the list.

Figure 10:
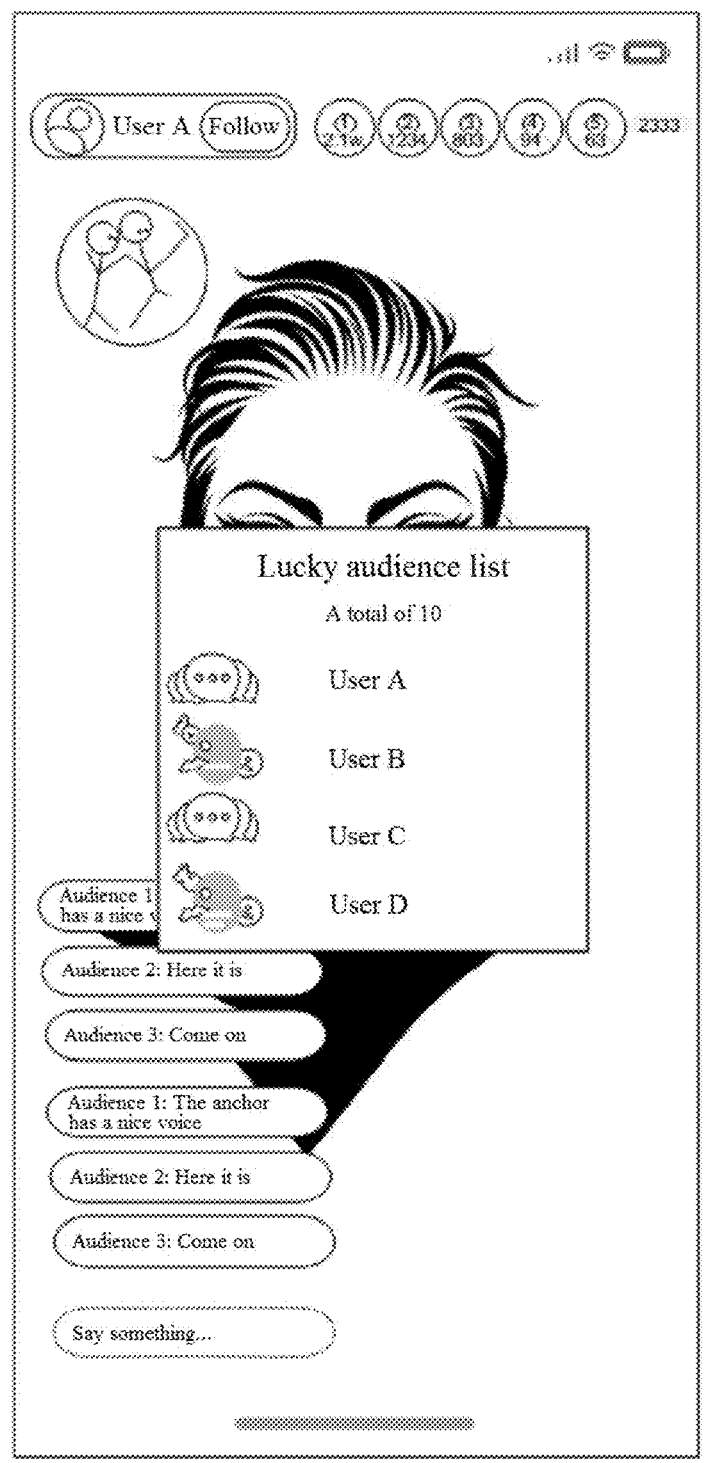
FIG. 10 is a schematic display diagram of a list of users winning the activity object according to an embodiment of the present disclosure.

When the user clicks the viewing entry for viewing the list on the activity object winning prompt window, the list of users winning the activity object is displayed. As shown in FIG. 10, FIG. 10 is a schematic display diagram of a list of users winning the activity object according to an embodiment of the present disclosure.

In practice, the list of users winning the activity object is displayed in response to a trigger operation for the viewing entry for viewing the list on the activity object winning prompt window, thereby improving the authenticity of the activity and improving user experience.

In the interaction method in the live streaming room according to the embodiment of the present disclosure, participation in the activity is realized by performing duet with the host in the live streaming room, thereby enriching the interaction manners in the live streaming room and improving the user experience in the live streaming room.

Figure 11:
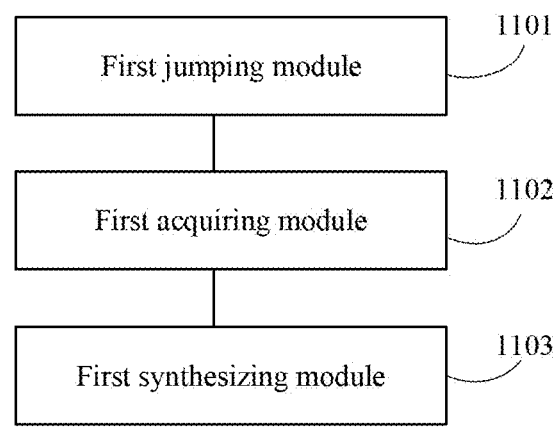
FIG. 11 is a schematic structural diagram of an interaction apparatus in a live streaming room according to an embodiment of the present disclosure.

Based on the above method embodiments, the present disclosure also provides an interaction apparatus in a live streaming room. Referring to FIG. 11, FIG. 11 is a schematic structural diagram of an interaction apparatus in a live streaming room according to an embodiment of the present disclosure. The apparatus includes: a first jumping module 1101 configured to jump, in response to a trigger operation for a preset duet entry on a live streaming room page, from the live streaming room page to a camera capture page, where a host portrait cutout corresponding to the live streaming room page is displayed on the camera capture page and a capture control is provided on the camera capture page; a first acquiring module 1102 configured to acquire multimedia information captured by a camera in response to a trigger operation for the capture control on the camera capture page, where the multimedia information includes an image or a video; and a first synthesizing module 1103 configured to synthesize the multimedia information with the host portrait cutout to obtain a duet multimedia product.

In an optional embodiment, the first jumping module includes: a first jumping submodule configured to jump, in response to the trigger operation for the preset duet entry on the live streaming room page, from the live streaming room page to an activity participation page corresponding to the preset duet entry, where activity introduction information is displayed on the activity participation page, and a duet participation control is provided on the activity participation page; and a second jumping submodule configured to jump, in response to a trigger operation for the duet participation control on the activity participation page, from the activity participation page to the camera capture page.

The apparatus further includes a first displaying module configured to display prompt information indicating successful participation in an activity on the live streaming room page in response to a successful publishing operation for the duet multimedia product.

In an optional embodiment, the apparatus further includes a switching module configured to switch a style of the host portrait cutout on the camera capture page.

In an optional embodiment, the multimedia information captured by the camera includes a portrait, and the first synthesizing module includes: a first determining submodule configured to determine, based on a preset layer order, a hierarchical relationship between the portrait in the multimedia information captured by the camera and the host portrait cutout; and a first synthesizing submodule configured to synthesize, based on the hierarchical relationship, the multimedia information captured by the camera with the host portrait cutout to obtain the duet multimedia product.

In an optional embodiment, the first synthesizing submodule includes: a cutout submodule configured to perform portrait cutout processing on the multimedia information captured by the camera to obtain a portrait cutout corresponding to the portrait in a case that the hierarchical relationship indicates that the portrait is in a layer over the host portrait cutout; and a second synthesizing submodule configured to arrange the portrait cutout in the layer over the host portrait cutout, and synthesize the portrait cutout and the host portrait cutout with the multimedia information captured by the camera to obtain the duet multimedia product.

In an optional embodiment, the first synthesizing submodule includes a third synthesizing submodule configured to synthesize, based on the hierarchical relationship, the multimedia information captured by the camera with the host portrait cutout to obtain the duet multimedia product, in a case that the hierarchical relationship indicates that the portrait is in a layer under the host portrait cutout.

In an optional embodiment, the apparatus further includes an adjusting module configured to adjust a display position and/or a display size of the host portrait cutout on the camera capture page.

In an optional embodiment, a capture posture line is displayed on the camera capture page, and the capture posture line is used to guide a capture posture of a user.

In an optional embodiment, the preset duet entry is configured with a countdown, the apparatus further includes a second display module configured to: upon detecting that the countdown corresponding to the preset duet entry is over, display prompt information indicating failure of participating in the activity on the live streaming room page if it is determined that there is no successful publishing operation for the duet multimedia product.

In an optional embodiment, the apparatus further includes: a third display module configured to display, in response to a message of winning an activity object of the activity corresponding to the activity participation page, a mailing information filling page, where a mailing information submission control is provided on the mailing information filling page; and a second acquiring module configured to acquire, in response to a trigger operation for the mailing information submission control, mailing information filled on the mailing information filling page, where the mailing information is used for mailing the activity object.

An interaction apparatus in a live streaming room is provided according to an embodiment of the present disclosure. In response to a trigger operation for a preset duet entry on a live streaming room page, a jump from the live streaming room page to a camera capture page is implemented, where a host portrait cutout corresponding to the live streaming room page is displayed on the camera capture page and a capture control is provided on the camera capture page. Multimedia information captured by a camera is acquired in response to a trigger operation for the capture control on the camera capture page, where the multimedia information includes an image or a video. The multimedia information captured by the camera is synthesized with the host portrait cutout to obtain a duet multimedia product. In the embodiments of the present disclosure, the duet function is provided in the live streaming room, a duet effect between the user and the host in the live streaming room is achieved, thereby enriching the interaction modes in the live streaming room and improving the user experience in the live streaming room.

In addition to the above method and apparatus, a computer-readable storage medium is provided according to an embodiment of the disclosure. The computer-readable storage medium stores instructions. The instructions, when being executed in a terminal device, cause the terminal device to perform the interaction method in the live streaming room according to the embodiment of the present disclosure.

A computer program product is provided according to an embodiment of the disclosure. The computer program product includes computer programs/instructions. The computer programs/instructions, when being executed by a processor, cause the processor to perform the interaction method in the live streaming room according to the embodiment of the present disclosure.

Figure 12:
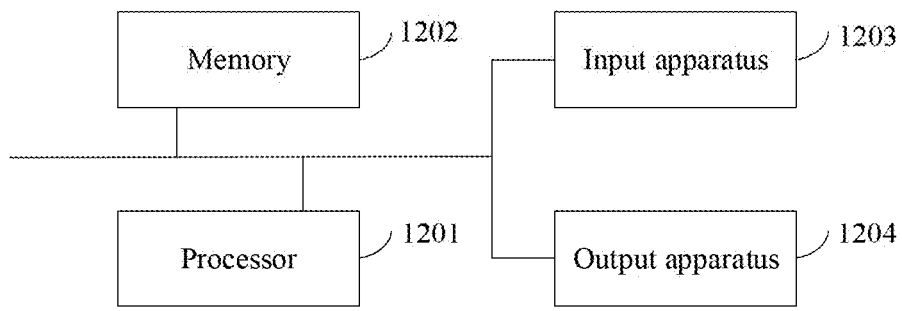
FIG. 12 is a schematic structural diagram of an interaction device in a live streaming room according to an embodiment of the present disclosure.

In addition, an interaction device in a live streaming room is provided according to an embodiment of the disclosure. As shown in FIG. 12, the device may include a processor 1201, a memory 1202, an input apparatus 1203 and an output apparatus 1204. There may be one or more processors 1201 in the interaction device in the live streaming room. One processor is taken as an example in FIG. 12. In some embodiments of the present disclosure, the processor 1201, the memory 1202, the input apparatus 1203 and the output apparatus 1204 may be connected via a bus or in other ways, where the connection via a bus is taken as an example in FIG. 12.

The memory 1202 may be configured to store a software program and module. The processor 1201 runs the software program and module stored in the memory 1202, to perform various functional applications and data processing of the interaction device in the live streaming room. The memory 1202 may mainly include a program storage area and a data storage area. An operating system, an application program required by at least one function and the like are stored in the program storage area. Moreover, the memory 1202 may include a high-speed random access memory, and may further include a non-volatile memory, such as at least one disk storage device, a flash device or other volatile solid-state storage device. The input apparatus 1203 may be configured to receive inputted number or character information, and generate a signal input related to user settings and function control of the interaction device in the live streaming room.

In the embodiment, the processor 1201 may load an executable file corresponding to the processes of one or more application programs into the memory 1202 in response to an instruction, and the processor 1201 executes the application program stored in the memory 1202, thereby realizing various functions in interaction device in the live streaming room.

It should be noted that the relationship terms "first", "second" and the like herein are used for distinguishing an entity or operation from another entity or operation, but not intended to necessitate or imply an actual relationship or order between these entities or operations. Furthermore, terms "include", "comprise" or any other variants are intended to cover the non-exclusive inclusion. Therefore, a process, method, article or device including a series of elements is not necessarily limited to those expressly listed elements, but may include other elements not expressly listed or inherent to the process, method, article, or device. Without further limitations, an element defined by the phrase "comprising a . . . " does not exclude the presence of additional identical elements in the process, method, article or device including said element.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the spirit and the scope of the present disclosure. Therefore, the present disclosure would not be limited to the embodiments described in this specification, but shall conform to the widest scope consistent with the principles and novel features disclosed herein.

The invention claimed is:

1. An interaction method in a live streaming room, comprising:
   jumping, in response to a trigger operation for a preset duet entry on a live streaming room page, from the live streaming room page to a camera capture page, wherein a host portrait cutout corresponding to the live streaming room page is displayed on the camera capture page and a capture control is provided on the camera capture page;
   acquiring multimedia information captured by a camera, in response to a trigger operation for the capture control on the camera capture page, wherein the multimedia information comprises an image or a video; and
   synthesizing the multimedia information with the host portrait cutout to obtain a duet multimedia product.

2. The method according to claim 1, wherein the jumping, in response to a trigger operation for a preset duet entry on a live streaming room page, from the live streaming room page to a camera capture page comprises:
   jumping, in response to the trigger operation for the preset duet entry on the live streaming room page, from the live streaming room page to an activity participation page corresponding to the preset duet entry, wherein activity introduction information is displayed on the activity participation page, and a duet participation control is provided on the activity participation page; and
   jumping, in response to a trigger operation for the duet participation control on the activity participation page, from the activity participation page to the camera capture page.

3. The method according to claim 2, wherein after synthesizing the multimedia information captured by the camera with the host portrait cutout to obtain the duet multimedia product, the method further comprises:
   displaying prompt information indicating successful participation in an activity on the live streaming room page, in response to a successful publishing operation for the duet multimedia product.

4. The method according to claim 2, wherein the preset duet entry is configured with a countdown, the method further comprises:
  upon detecting that the countdown corresponding to the preset duet entry is over, displaying prompt information indicating failure of participating in activity on the live streaming room page if it is determined that there is no successful publishing operation for the duet multimedia product.

5. The method according to claim 2, wherein a preset activity corresponding to the preset duet entry is configured with a preset participation condition, and before jumping from the live streaming room page to the activity participation page corresponding to the preset duet entry, the method further comprises:
  determining, in response to the trigger operation for the preset duet entry on the live streaming room page, whether a current user meets the preset participation condition, and
  the jumping from the live streaming room page to the activity participation page corresponding to the preset duet entry comprises:
  jumping from the live streaming room page to the activity participation page corresponding to the preset duet entry if it is determined that the current user meets the preset participation condition.

6. The method according to claim 3, wherein after displaying the prompt information indicating successful participation in the activity on the live streaming room page in response to the successful publishing operation for the duet multimedia product, the method further comprises:
  displaying, in response to a message of winning an activity object of the activity corresponding to the activity participation page, a mailing information filling page, wherein a mailing information submission control is provided on the mailing information filling page; and
  acquiring, in response to a trigger operation for the mailing information submission control, mailing information filled on the mailing information filling page, wherein the mailing information is used for mailing the activity object.

7. The method according to claim 6, wherein the displaying, in response to a message of winning an activity object of the activity corresponding to the activity participation page, a mailing information filling page comprises:
  displaying, in response to the message of winning the activity object of the activity corresponding to the activity participation page, an activity object winning prompt window on the live streaming room page, wherein an activity object receiving entry is provided on the activity object winning prompt window; and
  displaying, in response to a trigger operation for the activity object receiving entry on the activity object winning prompt window, the mailing information filling page.

8. The method according to claim 7, wherein a viewing entry for viewing a list of users winning the activity object is further provided on the activity object winning prompt window, and the method further comprises:
  displaying, in response to a trigger operation for the viewing entry on the activity object winning prompt window, the list of users winning the activity object.

9. The method according to claim 1, wherein before acquiring the multimedia information captured by the camera in response to the trigger operation for the capture control on the camera capture page, the method further comprises:
  switching a style of the host portrait cutout on the camera capture page.

10. The method according to claim 1, wherein the multimedia information captured by the camera comprises a portrait, and the synthesizing the multimedia information with the host portrait cutout to obtain a duet multimedia product comprises:
  determining, based on a preset layer order, a hierarchical relationship between the portrait in the multimedia information and the host portrait cutout; and
  synthesizing, based on the hierarchical relationship, the multimedia information with the host portrait cutout to obtain the duet multimedia product.

11. The method according to claim 10, wherein the synthesizing, based on the hierarchical relationship, the multimedia information with the host portrait cutout to obtain the duet multimedia product comprises:
  performing portrait cutout processing on the multimedia information to obtain a portrait cutout corresponding to the portrait in a case that the hierarchical relationship indicates that the portrait is in a layer over the host portrait cutout; and
  arranging the portrait cutout in the layer over the host portrait cutout, and synthesizing the portrait cutout and the host portrait cutout with the multimedia information to obtain the duet multimedia product.

12. The method according to claim 10, wherein the synthesizing, based on the hierarchical relationship, the multimedia information with the host portrait cutout to obtain the duet multimedia product comprises:
  synthesizing, based on the hierarchical relationship, the multimedia information with the host portrait cutout to obtain the duet multimedia product, in a case that the hierarchical relationship indicates that the portrait is in a layer under the host portrait cutout.

13. The method according to claim 1, wherein before synthesizing the multimedia information with the host portrait cutout to obtain the duet multimedia product, the method further comprises:
  adjusting at least one of a display position or a display size of the host portrait cutout on the camera capture page.

14. The method according to claim 1, wherein a capture posture line is displayed on the camera capture page, and the capture posture line is used to guide a capture posture of a user.

15. A non-transitory computer-readable storage medium storing instructions, wherein the instructions, when being executed in a terminal device, cause a terminal device to perform:
  jumping, in response to a trigger operation for a preset duet entry on a live streaming room page, from the live streaming room page to a camera capture page, wherein a host portrait cutout corresponding to the live streaming room page is displayed on the camera capture page and a capture control is provided on the camera capture page;
  acquiring multimedia information captured by a camera, in response to a trigger operation for the capture control on the camera capture page, wherein the multimedia information comprises an image or a video; and
  synthesizing the multimedia information with the host portrait cutout to obtain a duet multimedia product.

16. A device comprising a memory, a processor, and computer programs which are stored in the memory and operable on the processor, wherein the processor, when executing the computer programs, performs:
  jumping, in response to a trigger operation for a preset duet entry on a live streaming room page, from the live streaming room page to a camera capture page, wherein a host portrait cutout corresponding to the live streaming room page is displayed on the camera capture page and a capture control is provided on the camera capture page;
  acquiring multimedia information captured by a camera, in response to a trigger operation for the capture control on the camera capture page, wherein the multimedia information comprises an image or a video; and
  synthesizing the multimedia information with the host portrait cutout to obtain a duet multimedia product.

17. The device according to claim 16, wherein the processor is further configured to perform:
  jumping, in response to the trigger operation for the preset duet entry on the live streaming room page, from the live streaming room page to an activity participation page corresponding to the preset duet entry, wherein activity introduction information is displayed on the activity participation page, and a duet participation control is provided on the activity participation page; and
  jumping, in response to a trigger operation for the duet participation control on the activity participation page, from the activity participation page to the camera capture page.

18. The device according to claim 17, wherein the processor is further configured to perform:
  displaying prompt information indicating successful participation in an activity on the live streaming room page, in response to a successful publishing operation for the duet multimedia product.

19. The device according to claim 16, wherein the processor is further configured to perform:
  switching a style of the host portrait cutout on the camera capture page.

20. The device according to claim 16, wherein the multimedia information captured by the camera comprises a portrait, and the processor is further configured to perform:
  determining, based on a preset layer order, a hierarchical relationship between the portrait in the multimedia information and the host portrait cutout; and
  synthesizing, based on the hierarchical relationship, the multimedia information with the host portrait cutout to obtain the duet multimedia product.

* * * * *